Aug. 13, 1957     H. RIENER     2,802,411
PIE PLATE
Filed Feb. 5, 1952
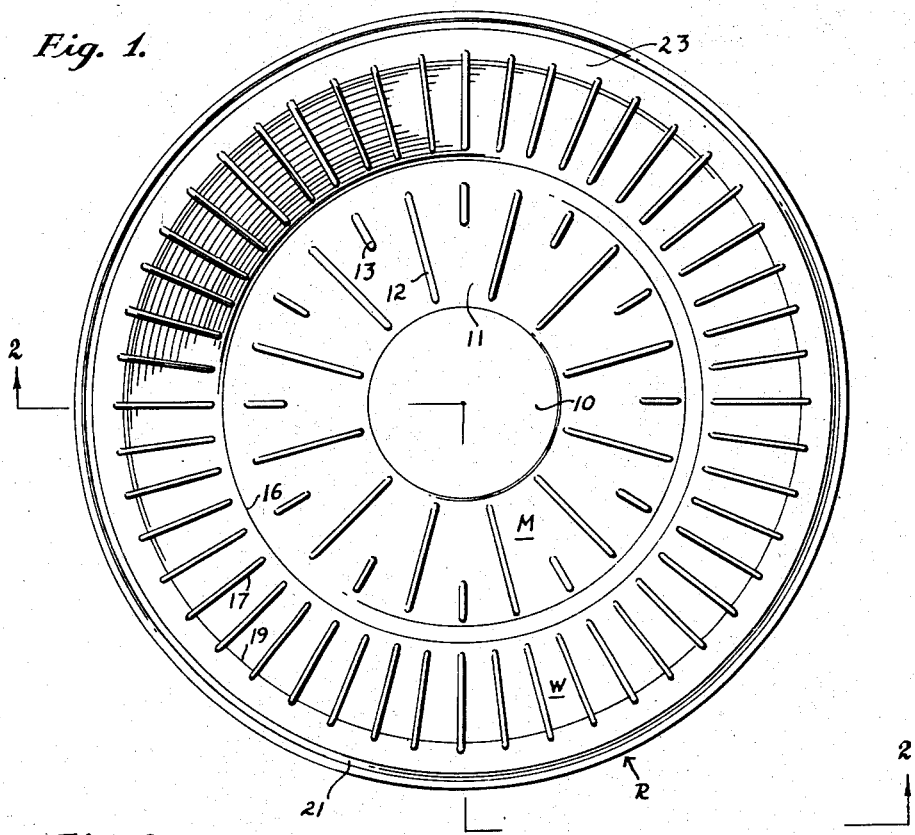
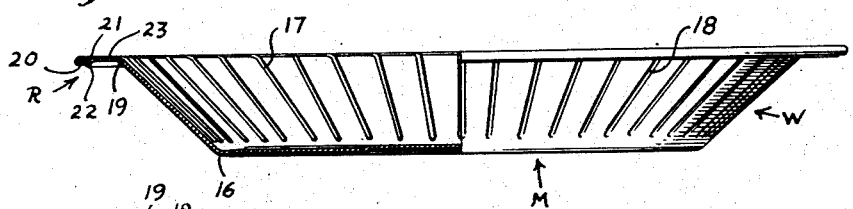
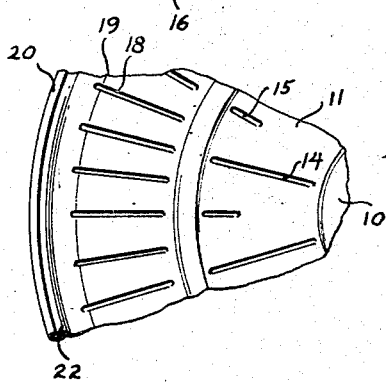
INVENTOR.
HARRY REINER
BY
ATTORNEYS.

2,802,411

PIE PLATE

Harry Riener, Philadelphia, Pa., assignor to Penny Plate, Inc., Haddonfield, N. J., a corporation of New Jersey Application February 5, 1952, Serial No. 269,920

1 Claim. (Cl. 99—428)

The present invention relates to pie plates and is concerned primarily with a pie plate of the type which is intended to be included along with a pie that is carried thereby during the pie making process and the various handlings and transactions which terminate with the pie in the hands of the ultimate purchaser.

For many years it was the practice for the commercial producers of pie to employ pie plates of heavy metal, and the cost of which was so great as to prohibit the inclusion of a pie plate with the pie at a sale. Thus, these old, heavy pie plates were employed for the pie making process and the handling of finished pies up to the point where they were sold to a customer. At the latter time it was necessary to remove the pie from the pie plate so that the latter could be retained for subsequent use.

In accordance with certain recent developments in the pie industry, it is now the practice to utilize a pie plate that is made of very thin metal, and the cost of which is so low as to permit of its being included in the final sales transaction. Thus, a customer in purchasing a pie, is given this thin plate, and the necessity of removing the pie from the plate in which it was baked is avoided. This practice is particularly desirable in that a pie that is sold in this manner is readily adapted to being placed in an oven for rewarming.

With the foregoing conditions in mind, the present invention has in view as its foremost objective the provision of a pie plate of the character indicated which is made of a very thin material and has a thickness in the neighborhood of four thousandths of an inch. The material is preferably a metal which is susceptible of being worked to the desired thickness such as aluminum. However, the invention also has in mind the use of a laminated sheet material having outer layers of metal foil and inner layers of paper or material comparable thereto.

Due to the thinness of the material as above indicated, it is evident that if the conventional construction of a pie plate were followed, the plate would not have sufficient strength and rigidity to withstand the normal handling thereof. Thus, another highly important object of the invention is to provide a pie plate of the character indicated having novel structural characteristics which afford properties of increased rigidity.

More in detail, the invention has an object the provision of a pie plate the general construction of which follows a conventional pie plate in that it includes a central, depressed, main body portion, a conical wall outstanding therefrom, and an annular rim in a plane substantially parallel to the main body portion.

In accordance with the present invention, this annular rim is turned back underneath on itself to provide an inturned flange which underlies the rim and provides in effect a double thickness of metal about the periphery of the pie plate. Immediately adjacent to this inturned flange, the rim is deformed to provide an annular groove on the upper surface and an annular rib on the lower surface. This groove and rib structure cooperates with the double thickness of metal about the periphery to achieve the required rigidity in the rim of the pie plate.

Another highly important object of the invention is to provide a pie plate of the character indicated with a conical wall that is formed with a series of radially extending upraised ribs. These ribs terminate just inside of the rim leaving a flat annular track for accommodating a pie rimmer. These ribs on the conical wall present certain decided advantages. In the first place, they increase the rigidity of the pie plate, and in the second instance, they provide passages for the escape of steam during the baking of a pie.

A pie having a crust that is soggy, is undesirable. What the customer wants is a crisp pie crust, and this can be achieved only by eliminating any steam which might be confined between the plate and the crust. These ribs in the conical wall are particularly beneficial in eliminating such steam which ordinarily might be confined beneath the pie crust.

A further object of the invention is to provide a pie plate of the character indicated which includes a central, depressed, main body portion that is also formed with a series of radially extending ribs. Like the ribs in the conical wall, the ribs of the main body portion offer increased rigidity and aid in the elimination of steam.

A pie plate including the structural characteristics above noted, and particularly the rim structure having the annular groove on the top and the rib on the bottom, presents the advantage of being easily handled during the various transactions which take place after baking. An operator may engage the depending rim with the finger nail and easily pull the pie from the rack in which it is carried. Having once pulled it free from the rack, the pie plate can be handled by engaging the bottom surface of the plate with the hand in a well-known manner.

Thus, any necessity of engaging the edible portions of the pie by the hands of the operator is avoided.

Various other more detailed objects and advantages of the invention, such as arise in connection with carrying out the above noted ideas in a practical embodiment, will in part become apparent and in part be hereinafter stated as the description of the invention proceeds.

The invention therefore comprises a pie plate that is made from thin metallic sheet material and which includes a central, depressed, main body portion, an outwardly flared conical wall, and an outer rim. The main body portion and conical wall are formed with series of radially extending ribs with the ribs in the conical wall terminating just inside the inner edge of the rim leaving a flat track for accommodating a pie rimmer.

The outer marginal edge of the rim is turned back underneath of the rim to provide an inwardly extending flange and a double thickness of metal about the periphery of the rim. Immediately adjacent to this inwardly extending flange, the rim is formed with an annular groove on its upper surface which creates a depending rib on the lower surface of the rim.

For a full and more complete understanding of the invention, reference may be had to the following description and accompanying drawing wherein:

Figure 1 is a top plan view of a pie plate that is more in accordance with the precepts of this invention.

Figure 2 is a side view partly in section and partly in elevation of the pie plate illustrated in Figure 1, this view being taken about on the planes represented by the line 2—2 of Figure 1; and Figure 3 is a fragmentary bottom plan view of the pie plate.

Referring now to the drawing wherein like reference characters denote corresponding parts, the pie plate of this invention is illustrated as being made from a single piece of sheet material. This material should be quite thin so as to hold the cost of a pie plate down to the point where it may be given away with a pie that is carried thereby. The invention has in mind the use of a metal which may be worked to a thickness of about four thousandths of an inch. Aluminum is a good example of such a metal. The invention also contemplates the use of a laminated material which would include metal foil as its outer layers which would be combined with inner layers of paper or a comparable material.

The pie plate comprises three main portions. These are: A central, depressed main body portion which is referred to entirely by the reference character M, an outwardly flared conical wall W, and a rim R all integrally joined and made from a single piece of the sheet material. The main body portion is of a generally flat circular construction and includes a central circular panel 10 which may be left plain or which may have inscribed thereon the name of a particular pie producer. Immediately adjacent to this central panel 10 there is a ring-like surface 11 which carries a series of long ribs 12 and a series of short ribs 13, the short ribs 13 being alternately interposed between the long ribs 12. The ribs 12 and 13 upstand from the top surface 11 and their formation creates corresponding grooves 14 and 15 on the bottom surface as illustrated in Figure 3.

The conical wall W is integrally joined to the main body portion M with the circular line of joinder between indicated at 16. This line of joinder may take the form of a slightly depressed groove on the top surface and the corresponding bead on the bottom surface as illustrated in Figure 2.

The wall W is formed with a series of radially extending ribs 17. Each of the ribs 17 extends from a point just above the line 16 over to a point just inside the rim R. The ribs 17 are upraised with respect to the upper surface of the wall W and form corresponding grooves 18 in the lower surface.

The rim R is integrally joined to the outer edge of the wall W along the circular line indicated at 19. The outer marginal edge of the rim R is a double thickness of metal provided by inturned flange 20 which is formed by turning the metal back on itself in a well known manner. Immediately adjacent to this bottom inturned flange 20, the rim R is deformed to provide an annular groove 21 on the top surface and a depending rib 22 on the bottom surface.

It is evident that this groove and rib structure 21 and 22 together with the double thickness of metal provided by the flange 20 affords good properties of strength and rigidity in the rim. It is also notable that the rib 17 terminates just inside the line 19 thus leaving an annular flat surface or track represented at 23 which readily accommodates a pie rimmer. It is conventional practice in the pie making art to press the pie crust dough down on to the rim, utilizing a pie rimmer for this purpose. If the ribs 17 extended completely across the rim R, there would be considerable interference with the operation of the pie rimmer.

*Operation*

While the manner of using the pie plate above described is believed to be obvious from the description of the parts given, it may be briefly outlined as follows:

The pie crust and filling is assembled on the pie plate in accordance with conventional practice, and a pie rimmer is employed to press the dough of the crust down against the rim R. The pie is then placed in an oven for baking. During the baking operation, any steam which might be created from the moisture contained and which might have a tendency to be confined between the crust and either the main body portion M and the wall W is permitted to escape because the ribs 12, 13, and 17 will ordinarily form very small passages beneath the crust.

When it becomes necessary to remove a pie from an oven or during any subsequent handling thereof, an operator may engage the rib 22 by the finger nail and withdraw the plate and pie carried thereby from the rack a distance sufficient to permit the undersurface to be engaged by the hand. Thus, any need for engaging any edible part of the pie by the hand is avoided.

The various rib and groove structures above described render the pie plate sufficiently rigid to be handled in the manner required. Moreover, due to the thinness of the metal, the cost is held down so low that it is entirely practical to give the pie plate away with each pie. This arrangement of selling the pies eliminates the need for removing a pie from a pie plate at the time the sale is made.

While a preferred specific embodiment of the invention is hereinbefore set forth, it is to be clearly understood that the invention is not to be limited to the exact materials and constructions illustrated and described, because various modifications of these details may be provided in putting the invention into practice within the purview of the appended claim.

What is claimed is:

In a thin metallic pie plate having a thickness in the nature of four one-thousandths of an inch, a circular, central, depressed main body portion, an outwardly flared conical wall integrally joined to said main body portion, said conical wall being formed with a series of spaced apart radially extending upraised ribs, and an annular rim integrally joined to the upper, outer edge of said conical wall, said ribs in the said conical wall being continued over into said rim and terminating just beyond the inner edge of said rim leaving a flat annular track for accommodating a pie rimmer.

References Cited in the file of this patent

UNITED STATES PATENTS

| | | |
|---|---|---|
| 476,340 | Wagandt | June 7, 1892 |
| 1,612,551 | Twohey | Dec. 28, 1926 |
| 1,945,397 | Gray | Jan. 30, 1934 |
| 2,226,155 | Bjornson | Dec. 24, 1940 |
| 2,304,966 | Thrower | Dec. 15, 1942 |
| 2,527,085 | Snow | Oct. 24, 1950 |